UNITED STATES PATENT OFFICE.

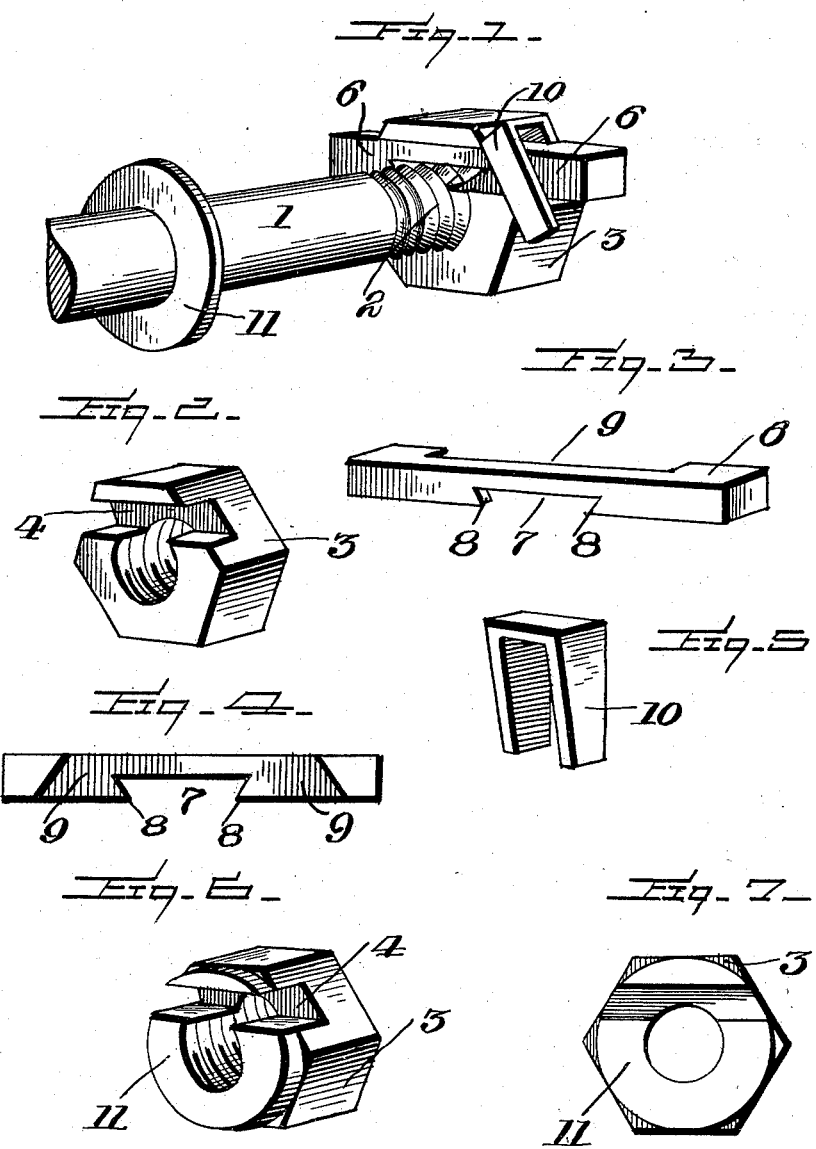

HUGH ANDERSON, OF WELLSVILLE, OHIO, ASSIGNOR OF ONE-HALF TO CHARLES C. LAWSON, OF WELLSVILLE, OHIO.

NUT-LOCK.

SPECIFICATION forming part of Letters Patent No. 705,812, dated July 29, 1902.

Application filed December 3, 1901. Serial No. 84,502. (No model.)

*To all whom it may concern:*

Be it known that I, HUGH ANDERSON, a citizen of the United States of America, residing at Wellsville, in the county of Columbiana and State of Ohio, have invented certain new and useful Improvements in Nut-Locks, of which the following is a specification, reference being had therein to the accompanying drawings.

This invention relates to certain new and useful improvements in nut-locks, and has for its object the provision of novel means whereby a nut is securely locked to a bolt and prevented from turning or jarring loose.

Another object of the present invention is to provide a nut-lock wherein the ordinary bolt is used in connection with a nut carrying a locking device that will be extremely simple in its construction, strong, durable, comparatively inexpensive to manufacture, easily placed in the locked position, and readily unlocked when desired.

The present invention also contemplates to construct a nut-lock that may be used a number of times; furthermore, provide a device that may be successfully used in connection with all forms of machinery, railway, bridge, and steel construction, and one that may be used to a great advantage in all instances where nuts and bolts are employed.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a perspective view of a bolt and nut provided with my improvements. Fig. 2 is a perspective view of the nut. Fig. 3 is a perspective view of the locking-key. Fig. 4 is a side elevation thereof looking at it in the reverse direction as shown in Fig. 2. Fig. 5 is a perspective view of the staple or clamp. Fig. 6 is a perspective view of a modified form of nut. Fig. 7 is a front elevation thereof.

In the drawings the reference-numeral 1 indicates a bolt carrying a head and provided with the ordinary screw-threads 2.

The reference-numeral 3 represents a nut having formed on its inner engaging face a groove 4. The reference-numeral 6 represents a locking-key which is adapted to be seated in said groove, said locking-key having formed therein a central cut-away portion 7, forming on each side thereof engaging teeth 8 8, these teeth being slightly inclined toward the center of the bolt.

The reference-numeral 9 represents a cut-away portion formed on the rear face of the locking-key, which forms enlarged ends, and between said enlarged ends and the outer face of the nut is formed a wedge-shaped guide-way to receive the staple 10, which when driven home will cause the opposite tooth of the locking-key to engage and slightly crush the screw-threads, thereby forming a locked engagement of the nut with the bolt that will prevent the latter from turning. This staple may be applied to either side of the nut or locking-key and the same result will be obtained.

The reference-numeral 11 represents a washer which may be used in connection with my improved nut-lock, and the same may be formed integral with the nut when desired, as shown in Figs. 6 and 7 of the drawings. It will also be noted that the washer may be entirely dispensed with in certain forms of construction when desired.

Particular attention is directed to the fact that various changes may be made in the details of construction without departing from the general spirit of my invention.

Having fully described my invention, what I claim as new, and desire to secure by Letters Patent, is—

1. In a nut-lock, the combination with a bolt and a nut having a recess formed therein, a key carrying engaging teeth secured in said recess of said nut, a staple producing a wedging action between said nut and key and engaging one of said teeth in the screw-threads of said bolt, substantially as described.

2. In a nut-lock, the combination of a bolt, a washer, a nut having a recess formed therein, a key having a central cut-away portion, inwardly-extending teeth formed on said key, said key arranged in the opening of said nut, and a staple secured between said nut and key to engage one of said teeth in the screw-threads of said bolt, all parts being arranged and operating substantially as described.

In testimony whereof I affix my signature in the presence of two witnesses.

HUGH ANDERSON.

Witnesses:
JOHN NOLAND,
E. E. POTTER.